US00RE48538E

(19) United States
(12) Reissued Patent
Kuramochi et al.

(10) Patent Number: US RE48,538 E
(45) Date of Reissued Patent: Apr. 27, 2021

(54) CEILING FAN HAVING REINFORCEMENTS

(71) Applicant: Panasonic Intellectual Property Management Co., Ltd., Osaka (JP)

(72) Inventors: Hiroyuki Kuramochi, Aichi (JP); Hironari Ogata, Gifu (JP); Daiki Sakito, Aichi (JP)

(73) Assignee: Panasonic Intellectual Property Mangement Co., Ltd., Osaka (JP)

(21) Appl. No.: 16/425,374

(22) Filed: May 29, 2019

Related U.S. Patent Documents

Reissue of:
(64) Patent No.: 9,915,268
Issued: Mar. 13, 2018
Appl. No.: 14/384,679
PCT Filed: Mar. 21, 2013
PCT No.: PCT/JP2013/001919
§ 371 (c)(1),
(2) Date: Sep. 11, 2014
PCT Pub. No.: WO2013/145656
PCT Pub. Date: Oct. 3, 2013

(30) Foreign Application Priority Data

Mar. 26, 2012 (JP) ..... 2012-069316
Mar. 26, 2012 (JP) ..... 2012-069317
(Continued)

(51) Int. Cl.
*F04D 29/34* (2006.01)
*F04D 25/08* (2006.01)
*F04D 29/38* (2006.01)

(52) U.S. Cl.
CPC ..... *F04D 29/34* (2013.01); *F04D 25/088* (2013.01); *F04D 29/388* (2013.01)

(58) Field of Classification Search
CPC ..... F04D 29/38; F04D 29/384; F04D 29/388; F04D 29/34; F04D 25/088
See application file for complete search history.

(56) References Cited

U.S. PATENT DOCUMENTS 6,059,531 A 5/2000 Tai
6,139,276 A 10/2000 Blateri et al.
(Continued)

FOREIGN PATENT DOCUMENTS

CN 2787893 Y 6/2006
CN 101772650 7/2010
(Continued)

OTHER PUBLICATIONS

Indian Office Action dated Apr. 15, 2019 for the related Indian Patent Application No. 6965/CHENP/2014.
(Continued)

*Primary Examiner* — Beverly M Flanagan
(74) *Attorney, Agent, or Firm* — Panasonic IP Management; Kerry S. Culpepper

(57) ABSTRACT

A ceiling fan includes blade (11) that is integrally formed of root (12), vane (13), and step (14) for maintaining vane (13) in a state inclined from horizontal. Blade (11) includes bend (16) *on upstream side* (*11c*), first reinforcement (17) on [upstream] *downstream* side [(11c)] (*11b*), and a plurality of second reinforcements (18) between bend (16) and first reinforcement (17). First reinforcement length (17a) is longer than second reinforcement length (18a). Further, the ceiling fan includes blade drop prevention portion (37) for locking blade (11) to support (10).

9 Claims, 12 Drawing Sheets

(30) Foreign Application Priority Data

Jan. 29, 2013 (JP) ..... 2013-014020
Jan. 29, 2013 (JP) ..... 2013-014021

(56) References Cited

U.S. PATENT DOCUMENTS

| | | | | |
|---|---|---|---|---|
| 2009/0004015 | A1 | 1/2009 | Wang | |
| 2010/0129225 | A1 | 5/2010 | Itou et al. | |
| 2010/0266415 | A1* | 10/2010 | Viens | F01D 5/282 416/226 |
| 2011/0002783 | A1 | 1/2011 | Yamamoto et al. | |
| 2012/0039717 | A1 | 2/2012 | Itou et al. | |

FOREIGN PATENT DOCUMENTS

| | | | |
|---|---|---|---|
| CN | 101946093 | | 1/2011 |
| JP | 3-030599 | U | 3/1991 |
| JP | 3-104511 | U | 10/1991 |
| JP | 5-069400 | U | 9/1993 |
| JP | 10-252692 | | 9/1998 |
| JP | 2009-121243 | | 6/2009 |
| JP | 2010-048119 | | 3/2010 |
| WO | 2009/019838 | | 2/2009 |

OTHER PUBLICATIONS

English Translation of Chinese Search Report dated Feb. 2, 2016 for the related Chinese Patent Application No. 201380017039.8.
International Search Report of PCT application No. PCT/JP2013/001919 dated Jun. 25, 2013.

* cited by examiner

CEILING FAN HAVING REINFORCEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application of U.S. Pat. No. 9,915,268 issued on Mar. 13, 2018 issued from U.S. patent application Ser. No. 14/384,679, filed on Sep. 11, 2014, which is a U.S. national stage application of the PCT International Application No. PCT/JP2013/001919 filed on Mar. 21, 2013, which claims the benefit of foreign priority of Japanese patent applications 2012-069316 filed on Mar. 26, 2012, 2012-069317 filed on Mar. 26, 2012, 2013-014020 filed on Jan. 29, 2013 and 2013-014021 filed on Jan. 29, 2013.*

TECHNICAL FIELD

The present invention relates to a ceiling fan.

BACKGROUND ART

A conventional ceiling fan suspended from a ceiling has the following configuration. That is, the ceiling fan includes a junction engageable with the ceiling, a motor provided in a lower part of the junction, a support rotatably provided in a circumference of the motor, and a plurality of metallic blades provided detachably from and attachably to the support. Each of the blades is formed of a root fixed to the support, a vane for blowing air by rotation of the support, and a step provided between the root and the vane, the step maintaining the vane in a state inclined from horizontal. In addition, the blade includes a bend on a downstream side in a rotational direction of the blade, the bend being bent downward, and a plurality of reinforcements in a center of the blade (see PTL 1).

In the above-described conventional example, strength of the blade is weak in some cases. That is, as a reaction of the blade rotating and pushing air down, stress occurs in the step of the blade. When the ceiling fan is used over a long period of time, the blade is sometimes damaged by metal fatigue caused by repeated loading.

Conventionally, a reinforcement is provided in the blade, and the strength is improved by this reinforcement. While the strength improves in a portion in which the reinforcement is provided, the stress concentrates on a portion in which the reinforcement is not provided. In the portion in which the stress concentrates, the blade is sometimes damaged by metal fatigue caused by repeated loading in a prolonged use of the ceiling fan.

In addition, the conventional ceiling fan includes a blade drop prevention portion for locking the blade to the support. However, mounting of this blade drop prevention portion is sometimes forgotten. Conventionally, in a field of mounting the ceiling fan, the blade drop prevention portion is fastened together with the blade to the support with screws.

This blade drop prevention portion is locked to the blade and fixed with tape, etc. Then, the blade drop prevention portion is screwed to the support together with the blade in a state where the blade drop prevention portion is fixed to the blade with tape, etc. Accordingly, in the field, due to the tape, etc. peeling off, the blade drop prevention portion and the blade are not fastened together to the support with screws by mistake, and only the blade is screwed to the support in some cases.

CITATION LIST

Patent Literature

PTL 1: Unexamined Japanese Patent Publication No. 2009-121243

SUMMARY OF THE INVENTION

The present invention is directed to a ceiling fan that includes a junction to be engaged with a ceiling, a motor provided in a lower part of the junction, a support for rotating in a circumference of the motor, and a plurality of blades detachably fixed to the support. Each of the blades is integrally formed of a root fixed to the support, a vane for blowing air by rotation of a rotor that constitutes the motor, and a step provided between the root and a tip of the vane, the step maintaining the vane in a state inclined from horizontal. In addition, the blade includes a bend on [a downstream] *an upstream* side in a rotational direction of the blade, the bend being bent downward, a first reinforcement on [an upstream] *a downstream* side in the rotational direction of the blade, the first reinforcement extending from the root partway to the tip, and a plurality of second reinforcements between the bend and the first reinforcement, the second reinforcements extending from the root partway to the tip. In addition, a first reinforcement length of the first reinforcement is longer than a second reinforcement length of each of the second reinforcements.

Thus, the first reinforcement and the plurality of second reinforcements are provided in a position in which the stress easily concentrates. Moreover, since the first reinforcement length is longer than the second reinforcement length, the strength increases on the downstream side in the rotational direction of the blade where stress concentration particularly easily occurs. Accordingly, the strength of the entire blade improves.

In addition, the present invention is a ceiling fan that includes a junction to be engaged with the ceiling, a motor provided in a lower part of the junction, a support for rotating in a circumference of the motor, a plurality of fixing portions provided in the support, a plurality of blades detachably fixed to the fixing portions, and a blade drop prevention portion for locking each of the blades to the support. The blade is integrally formed of a root fixed to the support, a vane for blowing air by rotation of a rotor that constitutes the motor, and a step provided between the root and a tip of the vane, the step maintaining the vane inclined from horizontal. The root has a locking hole and a plurality of fixing holes. The blade drop prevention portion includes a locking portion extending from the support and the locking hole locked by the locking portion. In addition, the blade is fixed to the support by connecting members fixed to the fixing portions via the fixing holes as well as by the locking portion inserted into the locking hole.

That is, unless the locking portion is inserted into the locking hole, the blade is not fixed to the fixing portions of the support with the connecting members. This prevents a failure to mount the blade drop prevention portion.

DESCRIPTION OF EMBODIMENTS

Exemplary embodiments of the present invention will be described below with reference to the drawings.

First Exemplary Embodiment

Figure 1:
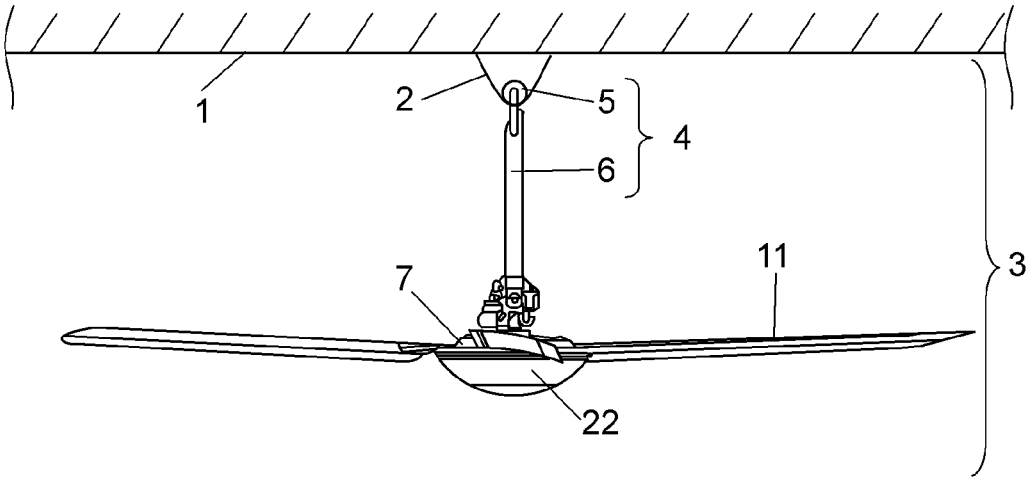
FIG. 1 is a diagram illustrating an overview of a ceiling fan according to a first exemplary embodiment of the present invention.
Figure 2:
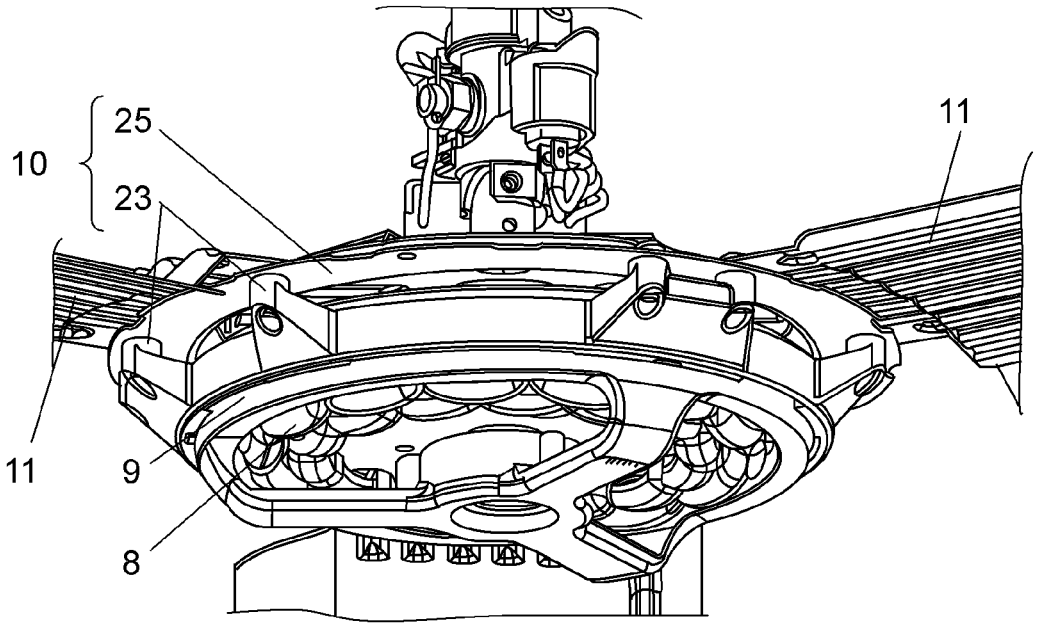
FIG. 2 is a diagram illustrating an overview of a ceiling fan body of the ceiling fan.
Figure 3:
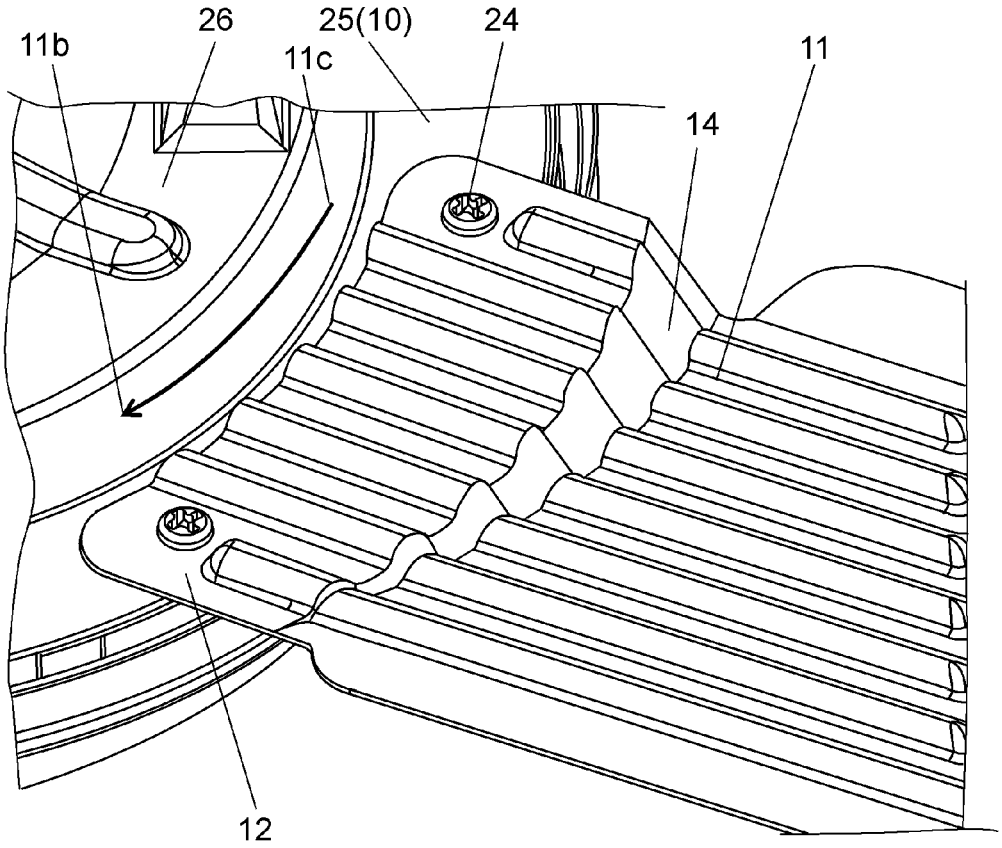
FIG. 3 is a diagram illustrating an overview of a root of a blade in the ceiling fan.

FIG. 1 is a diagram illustrating an overview of a ceiling fan according to a first exemplary embodiment of the present invention. FIG. 2 is a diagram illustrating an overview of a ceiling fan body of the ceiling fan. FIG. 3 is a diagram illustrating an overview of a root of a blade in the ceiling fan.

As illustrated in FIGS. 1 to 3, the ceiling fan includes suspending portion 2 fixed to ceiling 1 and ceiling fan body 3 engaged via suspending portion 2. Ceiling fan body 3 includes junction 4, motor 7, blades 11, and body cover 22.

Ceiling fan body 3 includes junction 4 in an upper part for being suspended by suspending portion 2. Junction 4 engages with ceiling 1. In addition, junction 4 includes joint 5 directly hooked on suspending portion 2 and cylindrical pipe 6 fixed to a lower part of joint 5.

Motor 7 is fixed to a lower part of pipe 6. Motor 7 includes generally disc-shaped stator 8 fixed to a lower part of pipe 6 and generally ring-shaped rotor 9 for rotating in a periphery of stator 8. Support 10 for rotating is provided in a circumference of rotor 9. That is, support 10 rotates in a circumference of motor 7. Support 10 includes two fixing portions 23 that are screw holes.

The plurality of metallic blades 11 detachably fixed to support 10 are fixed to fixing portions 23 with screws 24 that are connecting members. In addition, blades 11 are each fixed so as to extend from rotor 9 in an outward horizontal direction. As described above, the ceiling fan includes junction 4, motor 7, support 10, and blades 11.

Figure 4:
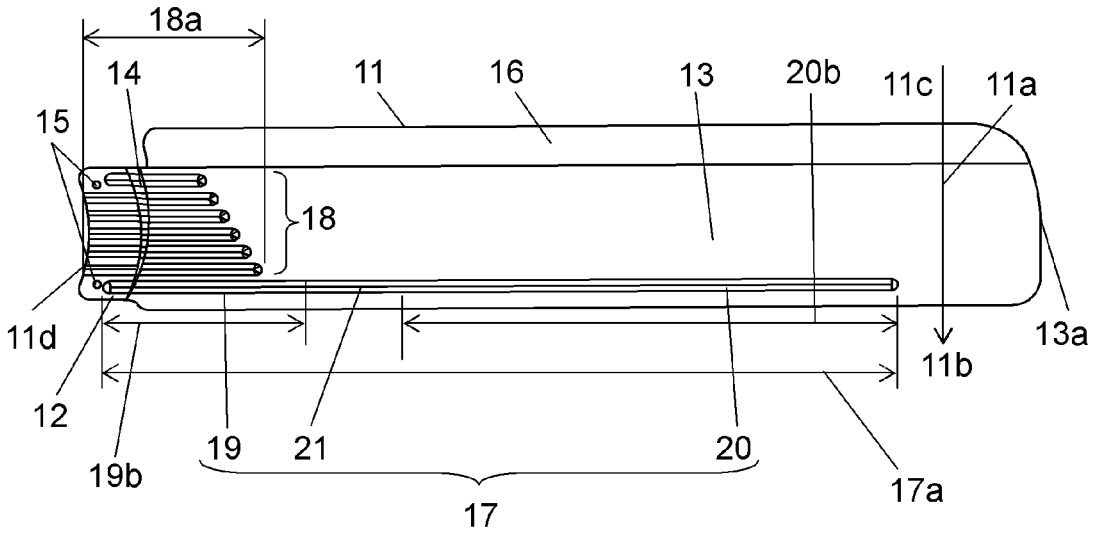
FIG. 4 is a plan view of the blade in the ceiling fan.

FIG. 4 is a plan view of the blade according to the first exemplary embodiment of the present invention. As illustrated in FIG. 4, blade 11 is integrally formed of root 12, vane 13, and step 14. In addition, a material of blade 11 is a metallic plate.

Root 12 is located on one side of blade 11, on a motor 7 side illustrated in FIG. 1. In addition, root 12 is fixed to support 10 illustrated in FIG. 3. As illustrated in FIG. 4, root 12 has two fixing holes 15. Fixing holes 15 are each a circular hole formed in a generally square flat board and fixed to support 10 illustrated in FIG. 2. Fixing holes 15 are each located near an end on upstream side 11c in rotational direction 11a of blade 11, and near an end on downstream side 11b. Blade 11 is fixed via fixing holes 15 to fixing portions 23 illustrated in FIG. 2 on an upper surface of support 10 with screws 24 illustrated in FIG. 3.

As illustrated in FIG. 2, support 10 is formed of fixing portions 23 and receptacle 25. Receptacle 25 is a ring-shaped flat board. As illustrated in FIG. 3, receptacle 25 is located in a circumference of generally disc-shaped motor upper cover 26. Receptacle 25 has a plurality of holes through which screws 24 pass. Receptacle 25 and motor upper cover 26 are integrally formed. As illustrated in FIG. 2 to FIG. 4, screws 24 are fixed to fixing portions 23 of support 10 via the holes in receptacle 25 and fixing holes 15 of blade 11. Blade 11 and motor upper cover 26 are fixed to support 10.

As illustrated in FIG. 4, vane 13 is located on another side, on an outward side of blade 11. Vane 13 blows air by rotation of rotor 9 illustrated in FIG. 2. Step 14 is located between root 12 and tip 13a of vane 13. In addition, step 14 maintains vane 13 in a state inclined from horizontal. In addition, step 14 is flat board-shaped extending from an end of root 12 to an end of vane 13. In step 14, a distance extending obliquely downward from root 12 becomes larger from downstream side 11b toward upstream side 11c. That is, step 14 is a generally triangle-shaped flat board.

These root 12, vane 13, and step 14 are integrally formed. That is, root 12, vane 13, and step 14 are manufactured from one sheet of metallic plate by press working.

Next, air-blowing operation of the ceiling fan will be described. In the ceiling fan, rotor 9 of motor 7 illustrated in FIG. 2 rotates by applying electric power to motor 7 illustrated in FIG. 1. This rotation also rotates blade 11 fixed to support 10 that is in a circumference of rotor 9. Herein, vane 13 illustrated in FIG. 4 inclines, by step 14, obliquely downward from downstream side 11b toward upstream side 11c in rotational direction 11a of blade 11, and thus air flowing along a lower surface of vane 13 is blown in a direction of a floor from a ceiling 1 side illustrated in FIG. 1.

A feature of the ceiling fan in the present first exemplary embodiment is in a shape of blade 11. Specifically, as illustrated in FIG. 4, blade 11 includes bend 16 on upstream side 11c in rotational direction 11a of blade 11, bend 16 being bent downward. In addition, blade 11 is provided with first reinforcement 17 on downstream side 11b in rotational direction 11a of blade 11, first reinforcement 17 extending from root 12 via step 14 partway to tip 13a of vane 13. Furthermore, blade 11 includes a plurality of second reinforcements 18 between bend 16 and first reinforcement 17, second reinforcements 18 extending from root 12 via step 14 partway to tip 13a of vane 13. Moreover, first reinforcement length 17a is longer than second reinforcement length 18a.

In step 14 on downstream side 11b illustrated in FIG. 4, stress easily concentrates by a moment produced when blade 11 blows air. However, since first reinforcement length 17a is longer than second reinforcement length 18a, the stress on downstream side 11b is dispersed. As a result, degrees of stress concentration approach each other between upstream side 11c and downstream side 11b of blade 11, and overall strength of blade 11 improves. Herein, first reinforcement 17 may extend from root 12 via step 14 to a vicinity of tip 13a of vane 13. This suppresses hanging down of tip 13a of vane 13 caused by the tip's own weight.

Figure 5:
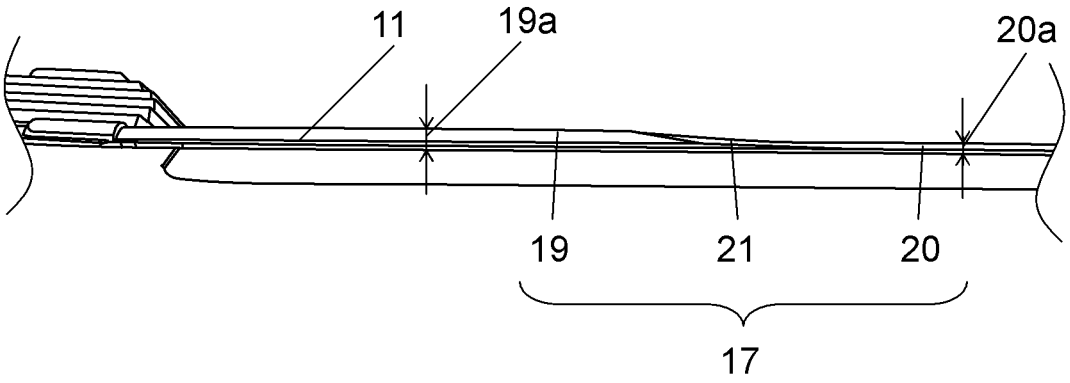
FIG. 5 is a side view illustrating an overview of a first reinforcement of the blade in the ceiling fan.
Figure 6:
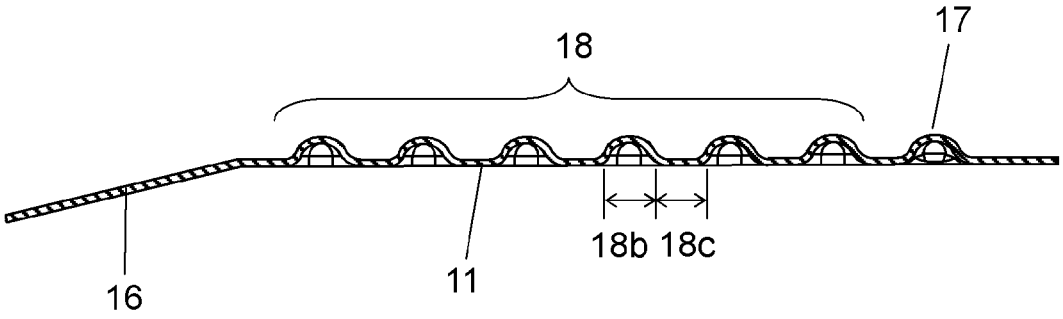
FIG. 6 is a cross-sectional view illustrating an overview of the first and second reinforcements of the blade in the ceiling fan.

FIG. 5 is a side view illustrating an overview of first reinforcement 17 of blade 11 in the ceiling fan according to the first exemplary embodiment of the present invention. FIG. 6 is a cross-sectional view illustrating an overview of first reinforcement 17 and second reinforcements 18 of blade 11 in the ceiling fan. As illustrated in FIG. 4 to FIG. 6, first reinforcement 17 is formed of first root side reinforcement 19 and first tip side reinforcement 20. First root side reinforcement 19 is located on a root 12 side of blade 11, and is a drawing portion produced by applying drawing bead processing. First tip side reinforcement 20 is located on a tip 13a side of blade 11, and is a drawing portion produced by applying drawing bead processing. These drawing portions have a protruded shape in a direction from a lower surface to an upper surface of blade 11. That is, a first root side reinforcement 19 and first tip side reinforcement 20 has a protruded curved shape in cross section along a plane perpendicular to rotational direction 11a of blade 11.

First tip side reinforcement 20 is located on a tip 13a side where an amount of blowing air is large compared with on the root 12 side. Since first tip side reinforcement height 20a is lower than first root side reinforcement height 19a, turbulent flow occurrence in first tip side reinforcement 20 is suppressed.

In addition, first tip side reinforcement length 20b is longer than first root side reinforcement length 19b. Moreover, first root side reinforcement length 19b is longer than second reinforcement length 18a. Furthermore, first tip side reinforcement 20 is disposed in a position lower than a position of first root side reinforcement 19. Accordingly, the turbulent flow occurrence in first tip side reinforcement 20 is further suppressed.

In step 14 on downstream side 11b, the stress easily concentrates by a moment produced when blade 11 blows air. However, first root side reinforcement length 19b is longer than second reinforcement length 18a. Accordingly, the stress on downstream side 11b is dispersed, and the degrees of stress concentration approach each other between upstream side 11c and downstream side 11b.

In addition, first inclination reinforcement 21 is provided between first root side reinforcement 19 and first tip side reinforcement 20. First inclination reinforcement 21 smoothly connects first root side reinforcement 19 and first tip side reinforcement 20. First inclination reinforcement 21 inclines obliquely downward from an end of first root side reinforcement 19, and extends to an end of first tip side reinforcement 20. This suppresses the stress concentration between first root side reinforcement 19 and first tip side reinforcement 20, both of which differ in height.

As illustrated in FIG. 3, in step 14, a distance extending obliquely downward from root 12 becomes larger from downstream side 11b toward upstream side 11c. Second reinforcement length 18a illustrated in FIG. 4 is longer as a vertical height in step 14 is lower. That is, second reinforcement length 18a becomes shorter from downstream side 11b toward upstream side 11c. In addition, an end on the tip 13a side of each of the plurality of second reinforcements 18 that extend partway to tip 13a of vane 13 is more distant from the root 12 side from upstream side 11c toward downstream side 11b.

In step 14, a distance extending obliquely downward from root 12 becomes larger from downstream side 11b toward upstream side 11c. Accordingly, step 14 relieves the stress concentration more on upstream side 11c than on downstream side 11b. In contrast, second reinforcement length 18a is longer from upstream side 11c toward downstream side 11b. Accordingly, second reinforcements 18 relieve the stress concentration more on downstream side 11b than on upstream side 11c. As a result, step 14 on upstream side 11c relieves the stress concentration on upstream side 11c. Second reinforcements 18 on downstream side 11b relieve the stress concentration on downstream side 11b. Therefore, the strength of overall blade 11 improves.

In addition, ends of first reinforcement 17 and the plurality of second reinforcements 18 on the root 12 side in blade 11 extend to vicinities of fixing holes 15. That is, in the vicinities of fixing holes 15, the strength is small compared with in step 14, and thus the stress concentrates.

As illustrated in FIG. 3, since first reinforcement 17 and the plurality of second reinforcements 18 extend to above receptacle 25, the strength in the vicinities of fixing holes 15 improves. As a result, the stress that occurs in the vicinities of fixing holes 15 is dispersed, and the strength of blade 11 further improves.

As illustrated in FIG. 4, since the ends of second reinforcements 18 on the root 12 side in blade 11 are located in the vicinities of fixing holes 15 that support weight of blade 11, the stress concentrates compared with on the tip 13a side. However, the ends of the plurality of second reinforcements 18 on the root 12 side in blade 11 extend to blade end 11d, and thus the strength of the ends on the root 12 side improves. As a result, the stress that occurs in the ends of second reinforcements 18 on the root 12 side is dispersed, and the strength of blade 11 further improves.

As illustrated in FIG. 6, each of the plurality of second reinforcements 18 has a protruded shape in cross section. Second reinforcement width 18b of the protruded shape is larger than second reinforcement separation length 18c between adjacent second reinforcements 18.

That is, second reinforcement width 18b is larger than second reinforcement separation length 18c, and thus second reinforcements 18 have a stronger structure, and the strength improves. As a result, the stress that occurs in root 12 and step 14 in blade 11 having second reinforcements 18 is dispersed, and the strength of blade 11 further improves.

Figure 7:
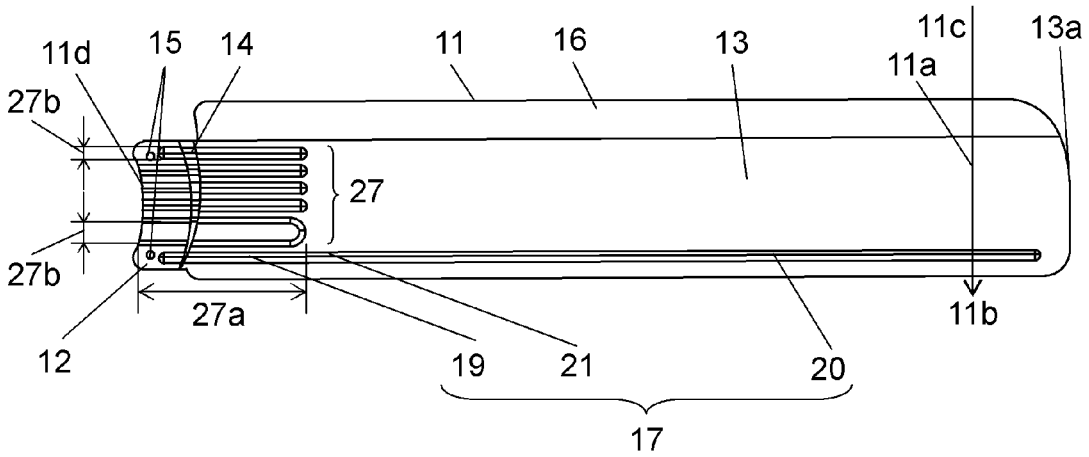
FIG. 7 is a plan view of another blade of the ceiling fan.

FIG. 7 is a plan view of another blade of the ceiling fan according to the first exemplary embodiment of the present invention. As illustrated in FIG. 7, second reinforcements 27 have a shape different from a shape of second reinforcements 18 of FIG. 4. Vane 13 is provided with first reinforcement 17 that extends from root 12 via step 14 partway to tip 13a of vane 13. In addition, second reinforcements 27 that extend from root 12 via step 14 partway to tip 13a of vane 13 are provided between bend 16 and first reinforcement 17.

Second reinforcement length 27a of each of second reinforcements 27 is almost identical. Second reinforcement width 27b is smaller on upstream side 11c than on downstream side 11b in rotational direction 11a of blade 11. Second reinforcement length 27a is a length of each of second reinforcements 27 from root 12 via step 14 partway to tip 13a of vane 13. Second reinforcement width 27b is a length of each of second reinforcements 27 from upstream side 11c toward downstream side 11b.

In step 14, a distance extending obliquely downward from root 12 becomes smaller from upstream side 11c toward downstream side 11b. Accordingly, the stress applied to downstream side 11b is large compared with the stress applied to upstream side 11c. In contrast, second reinforcement width 27b becomes larger on downstream side 11b than on upstream side 11c. Accordingly, in second reinforcements 27, the stress applied to downstream side 11b is small compared with the stress applied to upstream side 11c. As a result, the stress that occurs in step 14 and the plurality of second reinforcements 27 is dispersed by step 14 and the plurality of second reinforcements 27, and the strength of blade 11 further improves.

In the vicinities of fixing holes 15, the strength is small compared with in step 14, and thus the stress concentrates. In contrast, the ends of first reinforcement 17 and the plurality of second reinforcements 27 on the root 12 side extend to the vicinities of fixing holes 15. That is, first reinforcement 17 and the plurality of second reinforcements 27 extend to above receptacle 25, and thus the strength in the vicinities of fixing holes 15 improves. As a result, the stress that occurs in the vicinities of fixing holes 15 is dispersed, and the strength of blade 11 further improves.

Since the ends of the plurality of second reinforcements 27 on the root 12 side in blade 11 extend to blade end 11d, the strength of the ends on the root 12 side improves. As a result, the stress that occurs in the ends of second reinforcements 27 on the root 12 side in blade 11 is dispersed, and the strength of blade 11 further improves.

In addition, each of the plurality of second reinforcements 27 in a plane perpendicular to rotational direction 11a has a curved shape in cross section. A width of this curved shape is larger than a length between adjacent second reinforcements 27. That is, since the width of the curved shape of each of second reinforcements 27 is larger than a length between adjacent second reinforcements 27, second reinforcements 27 have a stronger structure, and the strength improves. As a result, the stress that occurs in root 12 and step 14 in blade 11 having second reinforcements 27 is dispersed, and the strength of blade 11 further improves.

Second Exemplary Embodiment

Figure 8:
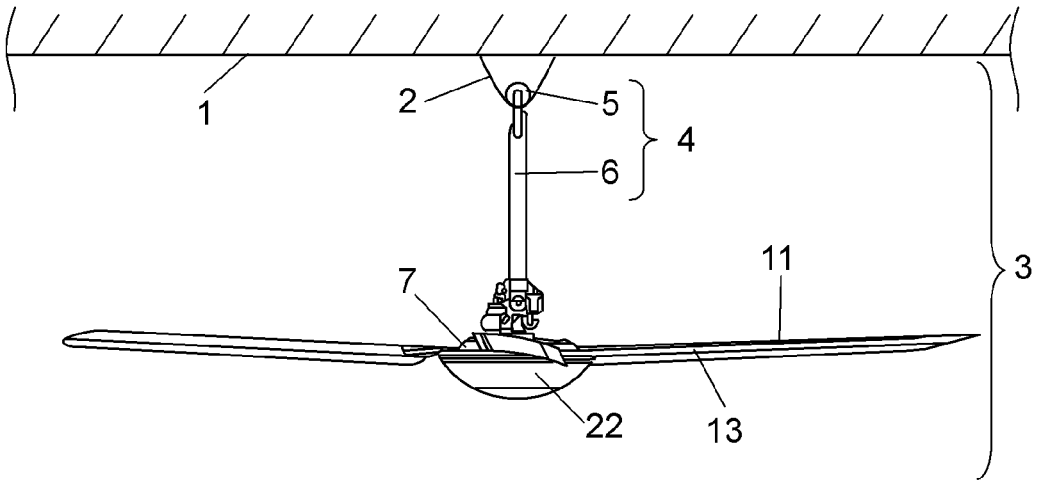
FIG. 8 is a diagram illustrating an overview of the ceiling fan according to a second exemplary embodiment of the present invention.
Figure 9:
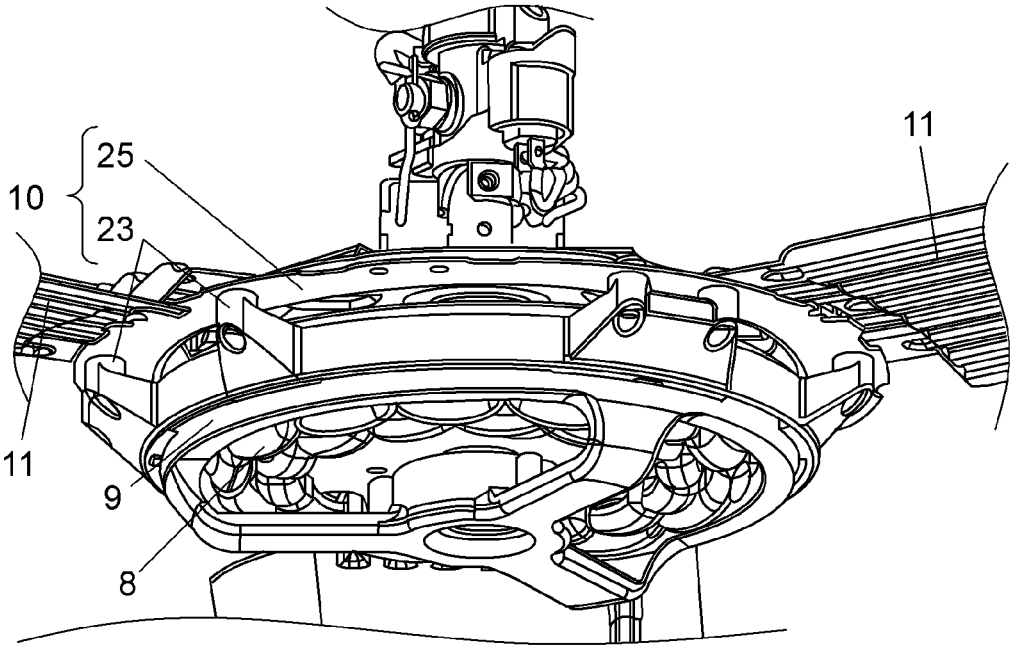
FIG. 9 is a diagram illustrating an overview of the ceiling fan body of the ceiling fan.
Figure 10:
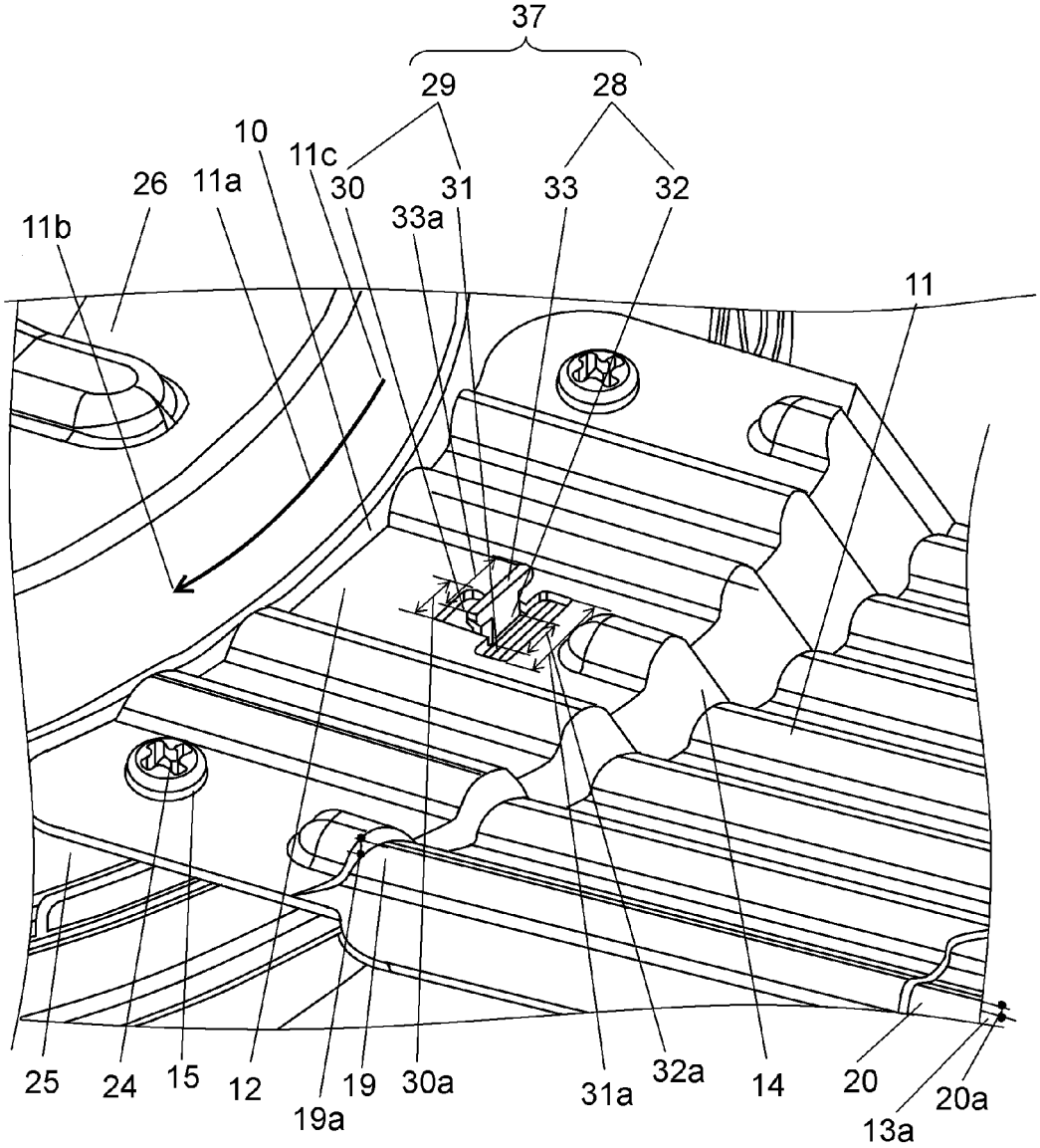
FIG. 10 is a diagram illustrating an overview of the root of the blade in the ceiling fan.

In a second exemplary embodiment of the present invention, identical reference numerals are used to refer to components identical to components of the first exemplary embodiment, and only a different point will be described. FIG. 8 is a diagram illustrating an overview of a ceiling fan according to the second exemplary embodiment of the present invention. FIG. 9 is a diagram illustrating an overview of a ceiling fan body of the ceiling fan. FIG. 10 is a diagram illustrating an overview of a root of a blade in the ceiling fan. As illustrated in FIG. 8 to FIG. 10, the ceiling fan includes junction 4, motor 7, support 10, blades 11, and blade drop prevention portion 37. Herein, support 10 is provided with a plurality of fixing portions 23. In addition, the plurality of metallic blades 11 are detachably fixed to portions 23. In addition, blade drop prevention portion 37 locks blade 11 to support 10.

Figure 11:
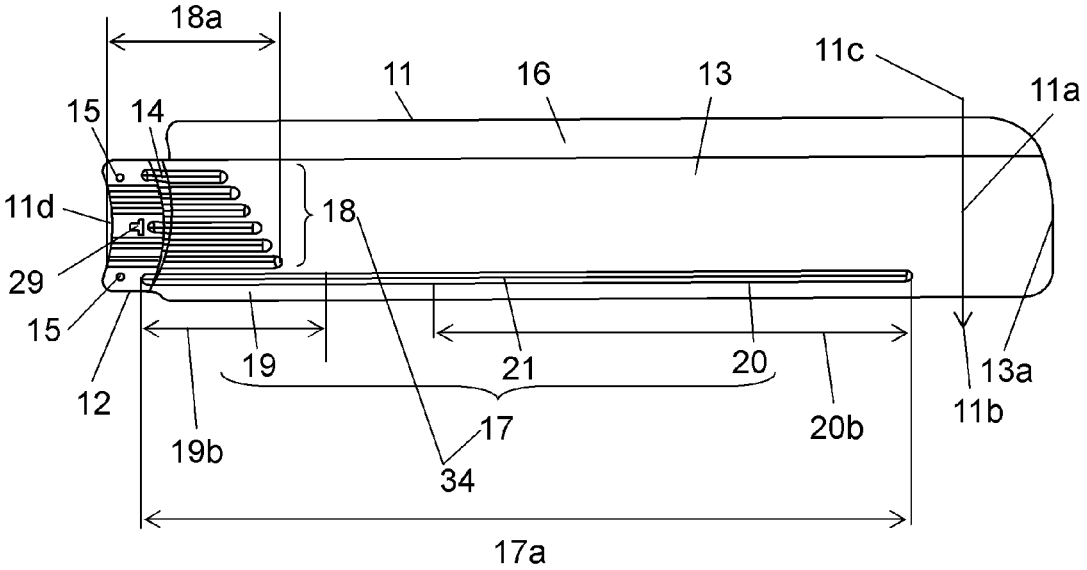
FIG. 11 is a plan view of the blade in the ceiling fan.

FIG. 11 is a plan view of blade 11 according to the second exemplary embodiment of the present invention. As illustrated in FIG. 11, root 12 has fixing holes 15 and locking hole 29 that is one T-shaped hole.

Locking hole 29 is located in root 12 in a center in rotational direction 11a of blade 11. As illustrated in FIG. 10, locking hole 29 includes first square hole 30 and second square hole 31. Herein, first square hole 30 is rectangle-shaped extending in a direction from root 12 to step 14. Second square hole 31 communicates with an opening end on the root 12 side of first square hole 30, and is rectangle-shaped. Second square hole length 31a of second square hole 31 in rotational direction 11a is longer than first square hole length 30a of first square hole 30 in rotational direction 11a.

As illustrated in FIG. 9, fixing portions 23 are located in a circumference of rotor 9. In addition, fixing portions 23 are each generally ring-shaped and include a plurality of screw holes.

As illustrated in FIG. 10, locking portion 28 extends from receptacle 25. Locking portion 28 is a T-shaped flat board extending perpendicularly upward from a peripheral end of receptacle 25. Locking portion 28 includes first square flat board 32 and second square flat board 33. Herein, first square flat board 32 is a rectangle-shaped flat board extending perpendicularly upward from the peripheral end of receptacle 25. Second square flat board 33 is a rectangle-shaped flat board provided in an upper end of first square flat board 32. Second square flat board length 33a of second square flat board 33 in rotational direction 11a is longer than first square flat board length 32a of first square flat board 32 in rotational direction 11a. In addition, second square flat board length 33a is longer than first square hole length 30a, and is shorter than second square hole length 31a. Furthermore, first square flat board length 32a is shorter than first square hole length 30a.

In addition, when blade 11 illustrated in FIG. 10 is fixed to support 10, first, locking portion 28 extending from receptacle 25 is inserted into locking hole 29 of blade 11. Herein, second square flat board 33 is inserted into second square hole 31. Blade 11 is moved in a direction of a tip of blade 11 by a predetermined distance. Then, first square flat board 32 enters first square hole 30. Then, fixing holes 15, holes in receptacle 25, and the screw holes in fixing portions 23 illustrated in FIG. 9 each communicate. Screws 24 are inserted into two screw holes that are fixing portions 23 via the holes in receptacle 25 and fixing holes 15. Then, blade 11 and motor upper cover 26 are fixed to support 10.

Next, air-blowing operation of the ceiling fan will be described. As illustrated in FIG. 8 to FIG. 10, in the ceiling fan, rotor 9 rotates by applying electric power to motor 7. This rotation also rotates blade 11 fixed to support 10. Herein, vane 13 inclines, by step 14, obliquely downward from upstream side 11c toward downstream side 11b, and thus the air flowing along a lower surface of vane 13 is blown in a direction of a floor from the ceiling 1 side.

A feature of the present second exemplary embodiment is in blade drop prevention portion 37. Blade drop prevention portion 37 locks blade 11 to support 10. Blade drop prevention portion 37 includes locking portion 28 extending from support 10 and locking hole 29. Herein, locking hole 29 is a hole in root 12, the hole being locked by locking portion 28. Blade 11 is fixed to support 10 by locking portion 28 being inserted into locking hole 29, and by screws 24 that are fixed to fixing portions 23 via fixing holes 15.

That is, blade 11 is not fixed to fixing portions 23 with screws 24 unless locking portion 28 is inserted into locking hole 29. Accordingly, a failure to mount blade drop prevention portion 37 is prevented, thereby improving mounting work efficiency.

As illustrated in FIG. 11, fixing holes 15 are each located in root 12 on upstream side 11c and downstream side 11b in rotational direction 11a of blade 11. In addition, blade 11 includes a plurality of reinforcements 34 extending from root 12 partway to tip 13a of vane 13.

As illustrated in FIG. 10 and FIG. 11, at least part of reinforcements 34 provided between the plurality of fixing holes 15 is located right above support 10, the part of reinforcements 34 approaching fixing holes 15. In addition, reinforcements 34 provided in an end on upstream side 11c and in an end on downstream side 11b are located distant from right above support 10, reinforcements 34 approaching fixing holes 15. Stress concentrates most between fixing holes 15 and reinforcements 34 provided in the end on upstream side 11c and in the end on downstream side 11b, respectively, reinforcements 34 approaching fixing holes 15. Accordingly, portions between fixing holes 15 and reinforcements 34 approaching fixing holes 15 may be damaged by metal fatigue resulting from repeated loading in prolonged use of the ceiling fan.

However, even when the portions between fixing holes 15 and reinforcements 34 approaching fixing holes 15 are damaged, blade 11 is securely locked by locking portion 28 extending from support 10, locking portion 28 being inserted into locking hole 29, thereby preventing drop. As illustrated in FIG. 11, blade 11 includes bend 16 on upstream side 11c, bend 16 being bent downward. Blade 11 is provided with first reinforcement 17 on downstream side 11b, first reinforcement 17 extending from root 12 via step 14 partway to tip 13a of vane 13. In addition, blade 11 includes a plurality of second reinforcements 18 between bend 16 and first reinforcement 17, second reinforcements 18 extending from root 12 via step 14 partway to tip 13a of vane 13. First reinforcement length 17a is longer than second reinforcement length 18a. Herein, reinforcements 34 include first reinforcement 17 and second reinforcements 18.

The stress easily concentrates in step 14 on upstream side 11c by a moment produced when blade 11 blows air. However, since first reinforcement length 17a is longer than second reinforcement length 18a, the stress on downstream side 11b is dispersed. As a result, the stress applied to upstream side 11c and the stress applied to downstream side 11b are almost equal. Thus, the stress that occurs in blade 11 is dispersed, and strength of step 14 in blade 11 improves. Accordingly, damage easily occurs between fixing holes 15 and reinforcements 34 approaching fixing holes 15 by metal fatigue resulting from repeated loading in prolonged use.

Herein, ends of the plurality of second reinforcements 18 on the root 12 side in blade 11 may extend to blade end 11d. This enlarges an area of second reinforcements 18 located right above receptacle 25, and thus the strength further improves by second reinforcements 18 in root 12. As a result, second reinforcements 18 disperse the stress that occurs in the end on the root 12 side, and further improves the strength of blade 11.

Herein, first reinforcement 17 may extend from root 12 via step 14 to a vicinity of tip 13a of vane 13. This suppresses hanging down of the tip of vane 13 caused by the tip's own weight.

In addition, first reinforcement 17 is formed of first root side reinforcement 19 and first tip side reinforcement 20. First root side reinforcement 19 is located on the root 12 side of blade 11, and is a drawing portion produced by applying drawing bead processing. First tip side reinforcement 20 is located on the tip 13a side of blade 11, and is a drawing portion produced by applying drawing bead processing. These drawing portions have a protruded shape in a direction from a lower surface to an upper surface of blade 11. That is, each of first root side reinforcement 19 and first tip side reinforcement 20 has a protruded curved shape in cross section along a plane perpendicular to rotational direction 11a of blade 11.

Herein, first tip side reinforcement height 20a is lower than first root side reinforcement height 19a. Accordingly, first tip side reinforcement 20, which is located on the tip 13a side where an amount of blowing air is large compared with on the root 12 side of blade 11, suppresses turbulent flow occurrence.

As illustrated in FIG. 11, first tip side reinforcement length 20b is longer than first root side reinforcement length 19b. Moreover, first root side reinforcement length 19b is longer than second reinforcement length 18a. As a result, first tip side reinforcement 20, which is located on the tip 13a side where the amount of blowing air is large compared with on the root 12 side of blade 11, suppresses turbulent flow occurrence.

In step 14 on downstream side 11b, the stress easily concentrates by a moment produced when blade 11 blows air. However, first root side reinforcement length 19b is longer than second reinforcement length 18a, and thus the stress on downstream side 11b is dispersed, and the stress applied to upstream side 11c and the stress applied to downstream side 11b are almost equal.

As illustrated in FIG. 11, first inclination reinforcement 21 is provided between first root side reinforcement 19 and first tip side reinforcement 20. First inclination reinforcement 21 smoothly connects first root side reinforcement 19 and first tip side reinforcement 20. First inclination reinforcement 21 inclines obliquely downward from an end of first root side reinforcement 19, and extends to an end of first tip side reinforcement 20.

This suppresses the stress concentration between first root side reinforcement 19 and first tip side reinforcement 20, both of which differ in height.

In step 14, a distance extending obliquely downward from root 12 becomes larger from downstream side 11b toward upstream side 11c. Moreover, second reinforcement length 18a is longer as a vertical height in step 14 is lower. That is, second reinforcement length 18a becomes shorter from downstream side 11b toward upstream side 11c. In addition, an end on the tip 13a side of each of the plurality of second reinforcements 18 that extend partway to tip 13a of vane 13 is more distant from the root 12 side from upstream side 11c toward downstream side 11b.

In step 14, a distance extending obliquely downward from root 12 becomes larger from downstream side 11b toward upstream side 11c. Accordingly, step 14 relieves the stress concentration more on upstream side 11c than on downstream side 11b. In contrast, second reinforcement length 18a becomes longer from upstream side 11c toward downstream side 11b. Accordingly, second reinforcements 18 relieve the stress concentration more on downstream side 11b than on upstream side 11c. Accordingly, step 14 on upstream side 11c relieves the stress concentration on upstream side 11c. Second reinforcements 18 on downstream side 11b relieve the stress concentration on downstream side 11b.

As a result, the stress that occurs in step 14 and the plurality of second reinforcements 18 is dispersed by step 14 and the plurality of second reinforcements 18. In view of the foregoing, damage easily occurs between fixing holes 15 and reinforcements 34 approaching fixing holes 15 by metal fatigue resulting from repeated loading in prolonged use.

In addition, each of the plurality of second reinforcements 18 in a plane perpendicular to rotational direction 11a has a curved shape in cross section. A width of this curved shape is larger than a length between adjacent second reinforcements 18.

That is, since the width of the curved cross-sectional shape of each of second reinforcements 18 is larger than the length between adjacent second reinforcements 18, second reinforcements 18 have a stronger structure, and the strength improves. As a result, the stress that occurs in root 12 and step 14 in blade 11 having second reinforcements 18 is dispersed, and the strength of blade 11 further improves.

Figure 12:
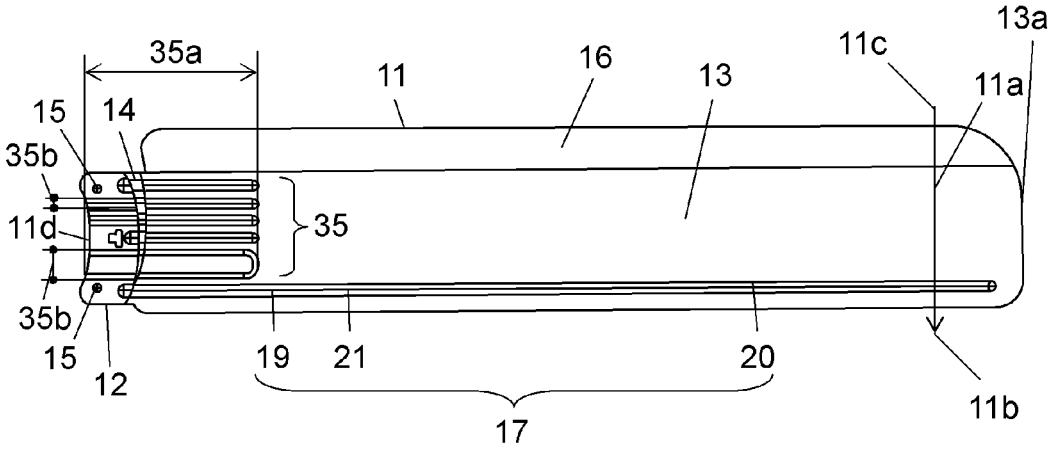
FIG. 12 is a plan view of another blade of the ceiling fan.

FIG. 12 is a plan view of another blade of the ceiling fan according to the second exemplary embodiment of the present invention. As illustrated in FIG. 12, first reinforcement 17 extends from root 12 via step 14 partway to tip 13a of vane 13. In addition, second reinforcements 35 are provided between bend 16 and first reinforcement 17, second reinforcements 35 extending from root 12 via step 14 partway to tip 13a of vane 13.

Second reinforcement length 35a of each of second reinforcements 35 is almost identical, and second reinforcement width 35b is smaller on upstream side 11c than on downstream side 11b. Herein, second reinforcement length 35a is a length in a direction extending from root 12 via step 14 to tip 13a of vane 13. In addition, second reinforcement width 35b is a length from upstream side 11c toward downstream side 11b.

A distance of step 14 extending obliquely downward from root 12 becomes smaller from upstream side 11c toward downstream side 11b. Accordingly, the stress applied to upstream side 11c is larger than the stress applied to downstream side 11b. In contrast, second reinforcement width 35b is larger on downstream side 11b than on upstream side 11c. Accordingly, second reinforcements 35 relieve the stress applied to downstream side 11b more than the stress applied to upstream side 11c. As a result, the stress that occurs in step 14 and the plurality of second reinforcements 35 is dispersed by step 14 and the plurality of second reinforcements 35. Accordingly, damage easily occurs between fixing holes 15 and second reinforcements 35 approaching fixing holes 15 by metal fatigue resulting from repeated loading in prolonged use of the ceiling fan.

Herein, the ends of the plurality of second reinforcements 35 on the root 12 side in blade 11 may extend to blade end 11d. This enlarges an area of second reinforcements 35 located right above receptacle 25 illustrated in FIG. 10, and thus the strength of root 12 further improves by second reinforcements 35. That is, the stress that occurs in the ends of second reinforcements 35 on the root 12 side is dispersed, and the strength of blade 11 further improves. Herein, second reinforcement width 35b may become smaller from downstream side 11b toward upstream side 11c.

In addition, each of the plurality of second reinforcements 35 in a plane perpendicular to rotational direction 11a has a curved shape in cross section. A width of this curved shape is larger than a length between adjacent second reinforcements 35.

That is, since the width of the curved cross-sectional shape of each of second reinforcements 35 is larger than the length between adjacent second reinforcements 35, second reinforcements 35 have a stronger structure, and the strength improves. As a result, the stress that occurs in root 12 and step 14 in blade 11 having second reinforcements 35 is dispersed, and the strength of blade 11 further improves.

INDUSTRIAL APPLICABILITY

Utilization of the present invention is expected as a ceiling fan for home use and office use.

REFERENCE MARKS IN THE DRAWINGS

1 ceiling
2 suspending portion
3 ceiling fan body
4 junction
5 joint
6 pipe
7 motor
8 stator
9 rotor
10 support
11 blade
11a rotational direction
11b downstream side
11c upstream side
11d blade end
12 root
13 vane
13a tip
14 step
15 fixing hole
16 bend
17 first reinforcement
17a first reinforcement length
18 second reinforcement
18a second reinforcement length
18b second reinforcement width
18c second reinforcement separation length
19 first root side reinforcement
19a first root side reinforcement height
19b first root side reinforcement length
20 first tip side reinforcement
20a first tip side reinforcement height
20b first tip side reinforcement length
21 first inclination reinforcement
22 body cover
23 fixing portion
24 screw (connecting member)
25 receptacle
26 motor upper cover
27, 35 second reinforcement
27a, 35a second reinforcement length
27b, 35b second reinforcement width
28 locking portion
29 locking hole
30 first square hole
30a first square hole length
31 second square hole
31a second square hole length
32 first square flat board
32a first square flat board length
33 second square flat board
33a second square flat board length
34 reinforcement
37 blade drop prevention portion

The invention claimed is:

1. A ceiling fan comprising:

a junction to be engaged with a ceiling;

a motor provided in a lower part of the junction;

a support configured to rotate in a circumference of the motor; and a plurality of blades detachably fixed to the support, wherein each of the blades is integrally formed of:

a root fixed to the support;

a vane configured to blow air by rotation of a rotor that constitutes the motor; and a step provided between the root and a tip of the vane, the step maintaining the vane in a state inclined from horizontal, each of the blades includes:

a bend on an upstream side in a rotational direction of each of the blades, the bend being bent downward;

a first reinforcement on the [upstream] *downstream* side in the rotational direction of each of the blades, the first reinforcement extending from the root partway to the tip; and a plurality of second reinforcements between the bend and the first reinforcement, the second reinforcements extending from the root partway to the tip, wherein a first reinforcement length of the first reinforcement is longer than a [second reinforcement] length of each of the second reinforcements extending from the root partway to the tip, and wherein the [second reinforcement] length *of each of the plurality of second reinforcements* becomes continuously shorter from a downstream side toward the upstream side.

2. The ceiling fan according to claim 1, wherein, in the step, a distance extending obliquely downward from the root becomes larger from the downstream side toward the upstream side.

3. The ceiling fan according to claim 1, wherein, in the step, a distance extending obliquely downward from the root becomes larger from the downstream side toward the upstream side, and a second reinforcement width that is a length of each of the second reinforcements from the upstream side toward the downstream side becomes larger on the downstream side than on the upstream side.

4. The ceiling fan according to claim 1, wherein the support comprises a plurality of fixing portions, the root has a plurality of fixing holes, each of the blades is fixed to the support with a connecting member through the fixing holes, and the first reinforcement and the plurality of second reinforcements extend to vicinities of the fixing holes.

5. The ceiling fan according to claim 1, wherein

*each of the blades includes a blade end, and* the plurality of second reinforcements extend to [a] *the* blade end of each of the blades.

6. The ceiling fan according to claim 1, wherein the first reinforcement is located on a root side, and is formed of a first root side reinforcement having a protruded shape in cross section along a plane perpendicular to the rotational direction.

7. A ceiling fan comprising:

a junction to be engaged with a ceiling;

a motor provided in a lower part of the junction;

a support configured to rotate in a circumference of the motor; and a plurality of blades detachably fixed to the support, wherein each of the blades is integrally formed of:

a root fixed to the support;

a vane configured to blow air by rotation of a rotor that constitutes the motor; and a step provided between the root and a tip of the vane, the step maintaining the vane in a state inclined from horizontal, each of the blades includes:

a bend on an upstream side in a rotational direction of each of the blades, the bend being bent downward;

a first reinforcement on the [upstream] *downstream* side in the rotational direction of each of the blades, the first reinforcement extending from the root partway to the tip *and over the step*; and a plurality of second reinforcements between the bend and the first reinforcement, the second reinforcements extending from the root partway to the tip, wherein a first reinforcement length of the first reinforcement is longer than a [second reinforcement] length of each of the second reinforcements, wherein the first reinforcement [is located on a root side, and] is further formed of:

a first root side reinforcement *located on the root and* having a protruded shape in cross section along a plane perpendicular to the rotational direction; and a first tip side reinforcement located on a tip side and having a protruded shape in cross section, [and]

wherein a first tip side reinforcement height of the first tip side reinforcement is lower than a first root side reinforcement height of the first root side reinforcement,

*a first root side reinforcement length of the first root side reinforcement is longer than the length of each of the plurality of second reinforcements*.

8. The ceiling fan according to claim 7, wherein a first tip side reinforcement length of the first tip side reinforcement is longer than [a] *the* first root side reinforcement length of the first root side reinforcement[, and the first root side reinforcement length is longer than the second reinforcement length].

9. The ceiling fan according to claim 8, further comprising:

a first inclination reinforcement provided between the first root side reinforcement and the first tip side reinforcement, for connecting the first root side reinforcement and the first tip side reinforcement.

* * * * *